United States Patent
Uno et al.

(10) Patent No.: US 6,449,239 B1
(45) Date of Patent: Sep. 10, 2002

(54) OPTICAL INFORMATION RECORDING MEDIUM WITH THERMAL DIFFUSION LAYER

(75) Inventors: Mayumi Uno; Noboru Yamada, both of Osaka; Ken'ichi Nagata, Hyogo; Hideo Kusada, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/442,900

(22) Filed: Nov. 18, 1999

(30) Foreign Application Priority Data

Nov. 25, 1998 (JP) ............................................. 10-334637

(51) Int. Cl.$^7$ ........................... G11B 7/24; G11B 11/00
(52) U.S. Cl. .................................. 369/275.1; 428/64.4
(58) Field of Search ............................. 369/275.1, 100, 369/60, 13, 116, 283, 288, 13.2, 13.46, 13.47, 13.43, 13.44, 13.45, 275.2, 13.58, 13.53; 428/64.1, 64.2, 64.4, 64.3, 694 DE, 694 MM, 694 MJ

(56) References Cited

U.S. PATENT DOCUMENTS

| | | | | |
|---|---|---|---|---|
| 5,309,427 A | * | 5/1994 | Matsumoto | 369/275.2 |
| 5,383,172 A | * | 1/1995 | Holtslag et al. | 369/100 |
| 5,545,454 A | * | 8/1996 | Yamada et al. | 428/64.1 |
| 5,652,036 A | * | 7/1997 | Kobayashi | 428/64.1 |
| 5,654,058 A | * | 8/1997 | Kirino et al. | 428/64.3 |
| 5,774,430 A | * | 6/1998 | Ikeda | 369/13.4 |
| 5,999,512 A | * | 12/1999 | Furuta | 369/275.1 |
| 6,017,620 A | * | 1/2000 | Yoshinari et al. | 428/336 |

FOREIGN PATENT DOCUMENTS

| | | |
|---|---|---|
| EP | 0 569 664 A1 | 2/1993 |
| EP | 0 566 107 A1 | 4/1993 |
| EP | 0 766 240 A2 | 2/1997 |
| EP | 0 887 791 A1 | 2/1997 |
| EP | 0 810 590 A2 | 5/1997 |
| JP | 8-50739 | 2/1996 |
| JP | 8-129777 | 5/1996 |

* cited by examiner

Primary Examiner—Ali Neyzari
(74) Attorney, Agent, or Firm—Merchant & Gould PC

(57) ABSTRACT

An optical information recording medium is provided in which recording can be performed at higher speed with higher density by enabling the cooling power of the recording medium to be improved, the overwritten-mark distortion to be decreased, and an medium with high transmittance to be obtained. The optical information recording medium is formed by laminating, sequentially on a substrate: a protective layer; an interface layer; a recording layer whose optical characteristics are varied reversibly by irradiation of a laser beam; an interface layer; a light transmittance type reflective layer that transmits the laser beam with a wavelength $\lambda$; and a thermal diffusion layer. A thickness d of the thermal diffusion layer is set to be within a range of $0 < d \leq (5/16)\lambda/n$ or $(7/16)\lambda/n \leq d \leq (1/2)\lambda/n$, wherein n indicates a refractive index of the thermal diffusion layer.

13 Claims, 9 Drawing Sheets laser beam

OPTICAL INFORMATION RECORDING MEDIUM WITH THERMAL DIFFUSION LAYER

FIELD OF THE INVENTION

The present invention relates to an optical information recording medium on which information can be recorded, reproduced, erased and rewritten with high density and at high speed using an optical means, such as irradiation of a laser beam.

BACKGROUND OF THE INVENTION

In an optical information recording medium, the difference in optical characteristics caused by local irradiation of a laser beam onto a recording material is utilized as a recording state. When using a material whose optical characteristics are varied reversibly, erasing and rewriting of information is possible. As rewritable media, generally a magneto-optical recording medium and a phase change recording medium have been well known. In these optical recording media, a large volume of information can be recorded, and recording, reproduction, erasure, and rewriting can be performed at high speed. In addition, such optical recording media are excellent in portability. Therefore, it is conceivable that in a highly information-oriented society, the demands for such optical recording media will further increase, and thus it is desired to increase further their capacity and the speed in recording, reproducing, erasing or rewriting information in them.

In the phase change recording medium, with respect to light with a specific wavelength the quantity of reflected light from a portion in a crystalline state is different from that from a portion in an amorphous state, and this difference is utilized as a recording state. By modulating an output power of the laser, erasure of recorded signals and recording by overwriting can be performed at the same time. Thus, information signals can be erased and rewritten easily at high speed.

FIG. 9 shows an example of a layer structure of a conventional phase change recording medium. As shown in FIG. 9, the conventional phase change recording medium includes a substrate 1, and a protective layer 2, a recording layer 4, a protective layer 8, and a reflective layer 6 that are laminated sequentially on the substrate 1. As the substrate 1, resin such as polycarbonate or PMMA, glass, or the like is used. In the substrate 1, a guide groove for guiding a laser beam is formed. The recording layer 4 has states different in optical characteristics and is formed of a material that can be varied reversibly between the different states. In the case of a rewritable phase change optical recording material, generally a chalcogenide-based material containing Te or Se as the main component is used as the material for the recording layer 4. Examples of the chalcogenide—based material include a material containing Te—Sb—Ge, Te—Sn—Ge, Te—Sb—Ge—Se, Te—Sn—Ge—Au, Ag—In—Sb—Te, In—Sb—Se, In—Te—Se, or the like as the main component. Generally, the reflective layer 6 is formed of metal such as Au, Al, Cr, or the like or an alloy thereof and is provided for the purpose of obtaining a heat release effect and effective optical absorption in the recording layer 4. In addition, for the purpose of preventing oxidation and corrosion of the optical information recording medium or adhesion of dust thereon, a configuration with an overcoat layer on the reflective layer 6 or a configuration in which a dummy substrate is laminated using ultraviolet curing resin as an adhesive is used in general, although it is omitted in the figure. The protective layers 2 and 8 have functions for protecting the recording layer 4, such as functions for preventing oxidation, evaporation, or deformation of a material of the recording layer 4. By adjusting the thickness of the protective layers 2 and 8, the absorptance of the recording medium or the difference in reflectance between a recording portion and an erasure portion (hereinafter referred to as "reflectance difference") can be adjusted. Therefore, the protective layers 2 and 8 also have a function for adjusting optical characteristics of the recording medium. As conditions of the material forming the protective layers 2 and 8, it is necessary that not only the above-mentioned purposes are attained but also excellent adhesiveness between, for example, the material of the recording layer 4 and the substrate 1 can be obtained and the protective layers 2 and 8 themselves are films with excellent weather resistance in which no cracks occur. Further, when the protective layers 2 and 8 are used while being in contact with the recording layer 4, the material of the protective layers 2 and 8 should be one that does not hinder the optical change of the material of the recording layer 4. As a material of the protective layers 2 and 8, in addition to sulfide such as ZnS or the like, oxide such as $SiO_2$, $Ta_2O_5$, $Al_2O_3$, or the like, nitride such as Ge—N, $Si_3N_4$, $Al_3N_4$, or the like, or nitrogen oxide such as Ge—O—N, Si—O—N, Al—O—N, or the like, dielectric such as carbide, fluoride, or the like, or suitable combinations thereof have been proposed. Generally, $ZnS$—$SiO_2$ has been used in many cases.

Conventionally, it has been known that when recorded signals are erased and rewritten, mark positions after rewriting are shifted slightly and overwriting distortion occurs. This distortion occurs because the manner of temperature rise when a laser beam is irradiated is different depending on whether the state of the recording layer 4 before rewriting is in an amorphous state or in a crystalline state, and thus rewritten marks have different lengths from predetermined lengths. In other words, when a mark is in an amorphous state, a latent heat is required for the phase change into an amorphous state at portions that were in a crystalline state before rewriting, but it is not required at portions that were in an amorphous state before rewriting. Therefore, an excess amount of heat changes a portion longer than a predetermined length in the recording layer 4 into an amorphous state. In order to solve this problem, a configuration is employed in which Ac/Aa is maintained to be larger than 1 and in a certain range, wherein Aa indicates optical absorptance of the recording layer 4 in an amorphous state and Ac represents optical absorptance of the recording layer 4 in a crystalline state. In other words, a configuration that enables so-called absorptive correction is employed. This promotes temperature increase at a crystalline portion and therefore a uniform temperature rise within a mark region after rewriting can be obtained. Thus, in this case, mark distortion does not occur easily.

As a method of attaining Ac/Aa>1, some methods have been proposed. For example, a configuration (satisfying Rc<Ra) in which the reflectance Ra of a portion in an amorphous state is set to be higher than the reflectance Rc of a portion in a crystalline state has been proposed. In this case, a high value of Ac/Aa can be obtained even when the reflectance difference Ra−Rc between the portion in the amorphous state and the portion in the crystalline state is set to be large. Concretely, for instance, Rc<Ra can be attained by providing another layer between the substrate 1 and the protective layer 2 in FIG. 7 and setting the optical constant of the another layer within a certain range.

Further, even in the case of Rc>Ra, Ac/Aa>1 can be attained. As methods for attaining this, those mainly using an optical transmission type medium and an optical absorption type medium have been known. The optical transmission type medium is used in a method in which the medium is allowed to have transmittance and a configuration satisfying 0<Tc<Ta is employed, wherein Ta indicates transmittance of the medium when its recording layer is in an amorphous state and Tc represents transmittance of the medium when its recording layer is in a crystalline state. The optical absorption type medium is used in a method in which a layer causing absorption is provided in the medium and a configuration satisfying 0<Ac2<Aa2 is employed, wherein Aa2 indicates optical absorption in this layer when the recording layer is in an amorphous state and Ac2 represents that when the recording layer is in a crystalline state. Concretely, in the case of the optical transmission type medium, Ac/Aa>1 can be attained by, for instance, reducing the thickness of the reflective layer 6 in FIG. 9 and enabling optical transmission. In the case of the optical absorption type medium, for example, Ac/Aa>1 can be attained by, for example, inserting a layer absorbing light between the reflective layer 6 and the protective layer 8 in FIG. 9.

As described above, a medium with a configuration satisfying a reflectance relationship of Rc<Ra has a great advantage in that a configuration satisfying Ac/Aa>1 can be designed easily. However, the sum of reflectance of the portions in an amorphous state and in a crystalline state is generally larger than that in a medium having a configuration satisfying a reflectance relationship of Rc>Ra. Therefore, there is a disadvantage in that noise in reproducing signals increases easily. In the case of a medium with a configuration satisfying a reflectance relationship of Rc>Ra, such a disadvantage is not caused easily. However, the medium has a disadvantage in that a large value of Ac/Aa cannot be obtained. Therefore, it is desirable to use these methods properly depending on required media.

With respect to the configuration of the optical transmission type medium satisfying Re>Ra and 0<Tc<Ta, conventionally some improvements have been proposed.

For example, in JP-A-8-050739, a technique is disclosed in which a recording layer and an optical transmission type reflective layer are provided and a thermal diffusion auxiliary layer for helping thermal diffusion in the reflective layer is provided while being contact with the reflective layer. This publication, however, does not describe about a technique for providing optical effects to the thermal diffusion auxiliary layer actively, and it is described that the thickness of the layer is set to be in a range in which optical design is not hindered. In JP-A-9-91755, a technique of providing a dielectric layer on an optical transmission type reflective layer is disclosed. In this case, however, the dielectric layer is provided for reducing phase difference and there is no description about thermal effects obtained by providing the dielectric layer. In addition, the publication also does not describe the optical effects obtained by adjusting the thickness of the layer.

As an example in which optical transmission type media are applied, a so-called multilayer recording medium technique has been known. This technique enables access to all recording media by providing at least two sets of recording media via a transparent separating layer and allowing a laser beam to be incident only from one side. By using this technique, the recording density in an incident direction of a laser beam can be increased and the capacity of the multilayer recording medium as a whole can be increased.

The optical transmission type configuration is advantageous in repeatability or adjacent erasing characteristics due to a relatively small amount of excess heat filling the inside of the medium. However, since the reflective layer is thin, it is difficult to cool a recording layer quickly after the layer was heated and therefore marks are difficult to be formed, which has been a problem. Furthermore, particularly in the case of a configuration satisfying Rc>Ra, basically it was difficult to have a very high value of Ac/Aa. In designing an optical transmission type medium to be positioned on an incident side of a laser beam for forming a multilayer recording medium, conventionally it was required to decrease the thickness of a recording layer to obtain sufficiently high transmittance. However, when the recording layer is very thin, crystallization occurs with difficulty. Consequently, it was difficult to obtain the compatibility between high transmittance and a high erasing ratio. There is no example considering a technique for further improving repeated recording characteristics of an optical transmission type medium. New techniques for further improving the repeated recording characteristics have been demanded.

SUMMARY OF THE INVENTION

The present invention aims to solve the above-mentioned problems in the conventional technique, to provide an optical information recording medium in which the cooling power of the recording medium can be improved, distortion of overwritten marks can be decreased, and recording can be performed at a higher speed with higher density, and to provide optical transmission type recording media for a multilayer recording medium in which the compatibility between high transmittance and a high erasing ratio can be obtained.

In order to attain the above-mentioned objects, a configuration of an optical information recording medium according to the present invention includes: a recording layer whose optical characteristics are varied reversibly by irradiation of a laser beam; a reflective layer that transmits the laser beam with a wavelength $\lambda$; and a thermal diffusion layer provided while being in contact with the reflective layer. The configuration is characterized in that a thickness d of the thermal diffusion layer is within a range of $0<d\leq(5/16)\lambda/n$ or $(7/16)\lambda/n\leq d\leq(1/2)\lambda/n$, wherein n indicates a refractive index of the thermal diffusion layer. According to the configuration of this optical information recording medium, the cooling power of the recording layer can be further improved and at the same time the overwriting distortion can be decreased due to the improvement in value of Ac/Aa. Therefore, recording can be performed at higher speed with higher density.

In the configuration of the optical information recording medium according to the present invention, it is preferable that the thermal conductivity of a material forming the thermal diffusion layer is at least 0.05 W/m·K at 500K. According to this preferable example, the cooling effect in the thermal diffusion layer can be further improved.

In the configuration of the optical information recording medium according to the present invention, it is preferable that a refractive index of the thermal diffusion layer is at least 1.6 with respect to a wavelength of a laser beam used for recording and reproduction of information. According to this preferable example, the effect for increasing the value of Ac/Aa in the thermal diffusion layer can be made more effective.

In the configuration of the optical information recording medium according to the present invention, it is preferable that an absorption coefficient of the thermal diffusion layer is 1.5 or less with respect to a wavelength of a laser beam used for recording and reproduction of information. According to this preferable example, heat generation in the thermal diffusion layer can be further suppressed, thus allowing the cooling effect in the thermal diffusion layer to be more effective.

In the configuration of the optical information recording medium according to the present invention, it is preferable that the thermal diffusion layer contains at least one selected from a group consisting of Al—N, Al—O—N, Al—C, Si, Si—N, SiO$_2$, Si—O—N, Si—C, Ti—N, TiO$_2$, Ti—C, Ta—N, Ta$_2$O$_5$, Ta—O—N, Ta—C, Zn—O, ZnS, ZnSe, Zr—N, Zr—O—N, Zr—C, and W—C.

In the configuration of the optical information recording medium according to the present invention, it is preferable that the reflective layer contains at least one selected from a group consisting of Au, Ag, and Cu. According to this preferable example, the value of Ac/Aa can be set to be large and at the same time high cooling power can be obtained due to high thermal conductivity even in the case where the reflective layer is thin.

In the configuration of the optical information recording medium according to the present invention, it is preferable that the reflective layer has a thickness between 1 nm and 20 nm. When the reflective layer is thinner than 1 nm, it is difficult to form it so as to be a uniform layer. Therefore, thermal and optical effects of the reflective layer decrease. In the case where the reflective layer is thicker than 20 nm, the light transmittance of the medium decreases and therefore it is difficult to obtain the optical absorptive correction (Ac/Aa>1).

In the configuration of the optical information recording medium according to the present invention, it is preferable that the recording layer has a thickness between 3 nm and 20 nm. When the recording layer is thinner than 3 nm, it is difficult to form a recording material into a uniform layer. Therefore, effective phase change between an amorphous state and a crystalline state is difficult to ensure. In the case where the recording layer is thicker than 20 nm, the thermal diffusion within an inplane of the recording layer increases, thus causing adjacent erasure easily in performing recording with high density.

In the configuration of the optical information recording medium according to the present invention, it is preferable that the recording layer is formed of a phase change material containing at least one selected from a group consisting of Te, Se, and Sb.

In the configuration of the optical information recording medium according to the present invention, it is preferable that the optical information recording medium has an average light transmittance between 40% and 80% with respect to the laser beam, further preferably between 50% and 70%. In this case, the average light transmittance is defined as the transmittance in a state where signals have been recorded in the medium (hereinafter, the average light transmittance is referred to simply as "light transmittance"). According to this preferable example, when in the medium, another recording medium is provided on the opposite side to an incident side of a laser beam, recording and reproduction in both the media can be performed only by the irradiation of the laser beam from one side. It is highly preferred to employ a configuration of this so-called multilayer recording medium, since the recording capacity of the medium can be increased efficiently.

Moreover, in this case, it is preferable that at least one other optical information recording medium is provided on the side opposite to an incident side of the laser beam. According to this preferable example, further a high-density medium can be obtained.

In the configuration of the optical information recording medium according to the present invention, it is preferable that an interface layer having an effect for facilitating crystallization of the recording layer is provided while being in contact with at least one side of the recording layer.

Particularly when an optical transmission type medium is designed so as to have high light transmittance, a recording layer becomes very thin and therefore the crystallization of the recording layer is difficult in many cases. However, when the interface layer is provided while being in contact with the recording layer, it is possible to shorten the time required for the crystallization of the material of the recording layer, thus enabling recording at higher speed.

Further, in this case, it is preferable that the interface layer is formed of a material containing at least N. A material containing N is excellent in denseness, thus greatly shortening the time required for the crystallization of the material of the recording layer.

DETAILED DESCRIPTION OF THE INVENTION

The present invention is described further in detail using the following embodiments.

First Embodiment

Figure 1:
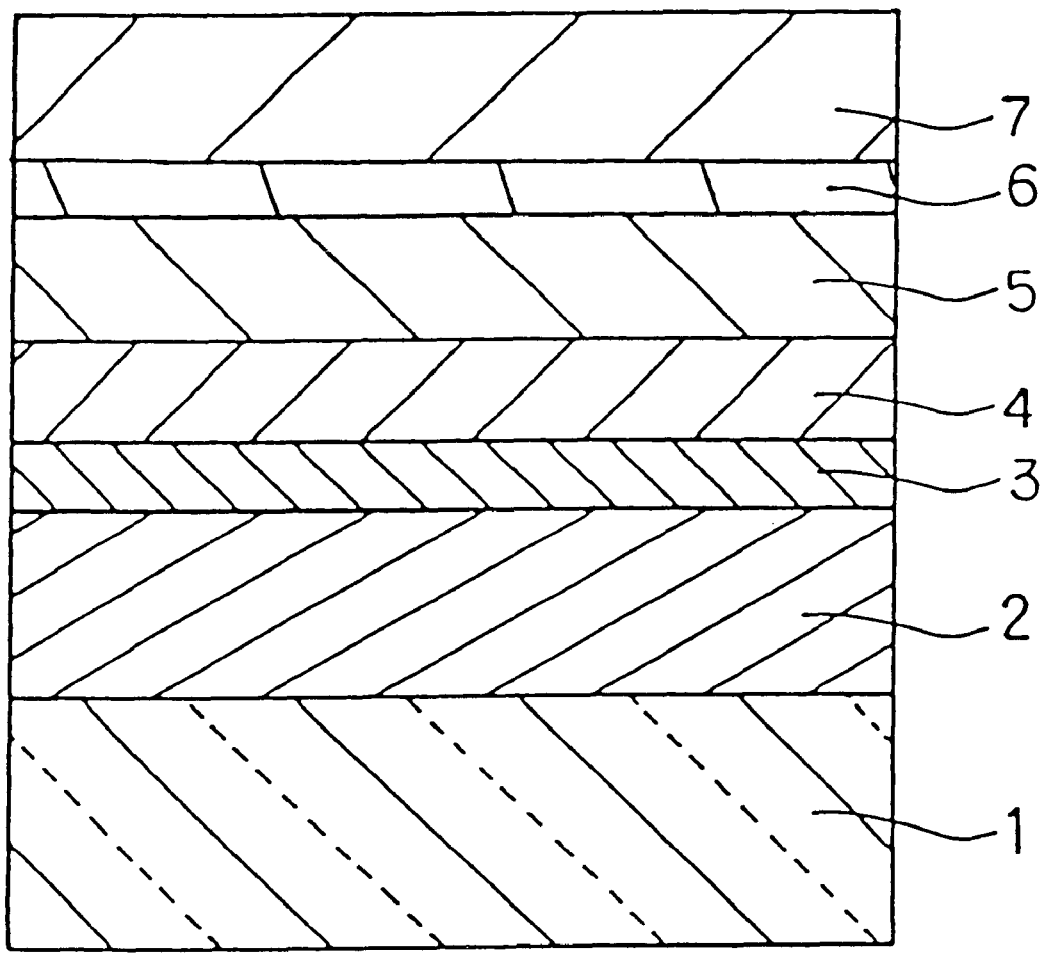
FIG. 1 is a cross-sectional view showing a layer structure of an optical information recording medium according to an embodiment of the present invention.

FIG. 1 is a cross-sectional view showing a layer structure of an optical information recording medium according to a first embodiment of the present invention.

As shown in FIG. 1, an optical information recording medium of the present embodiment includes a substrate 1, and a protective layer 2, an interface layer 3, a recording layer 4, an interface layer 5, an optical transmission type reflective layer 6, and a thermal diffusion layer 7 that are laminated sequentially on the substrate 1. In this case, the recording layer 4 is formed of a material whose optical characteristics are varied reversibly by irradiation of a laser beam.

The present invention is not limited to the above-mentioned structure. Any structures may be acceptable as long as they include the recording layer 4, the optical transmission type reflective layer 6, and the thermal diffusion layer 7 that is in contact with the reflective layer 6. For instance, the present invention can be applied to various structures such as one including another layer such as a protective layer between the interface layer 5 and the reflective layer 6, one in which the whole protective layer 2 is replaced by the interface layer 3, or one including no interface layer 3, instead of the structure as shown in FIG. 1.

It is preferred to use resin such as polycarbonate or PMMA, glass, or the like as the material of the substrate. Further, it is preferable that guide grooves for guiding a laser beam are formed in the substrate 1.

The protective layer 2 is provided mainly for the purpose of adjusting optical characteristics of, for example, enabling effective optical absorption in the recording layer 4. As a material of the protective layer 2, one that enables the above-mentioned purpose to be achieved is used. Examples of such a material include sulfide such as ZnS or the like, oxide such as $SiO_2$, $Ta_2O_5$, $Al_2O_3$, or the like, nitride such as Ge—N, $Si_3N_4$, $Al_3N_4$, or the like, nitrogen oxide such as Ge—O—N, Si—O—N, Al—O—N, or the like, dielectric such as carbide, fluoride, or the like, or suitable combinations thereof (for example, ZnS—$SiO_2$)

The interface layers 3 and 5 serve for protecting the recording layer 4 by, for example, preventing oxidation, corrosion, or deformation of the recording layer 4 and also perform the following two important roles by being provided while being in contact with the recording layer 4.

A first important role of the interface layer is to prevent atomic diffusion between the recording layer 4 and the protective layer 2, and particularly when the protective layer 2 contains sulfur or sulfide, to prevent such a component from diffusing into the recording layer 4. By preventing this atomic diffusion, the repeatability of the medium is improved greatly. The interface layer may be positioned on any one side or both sides of the recording layer 4. In order to prevent the atomic diffusion further effectively, however, it is preferred to provide the interface layer on both sides of the recording layer 4. When the interface layer is provided only on one side of the recording layer 4, the effect for suppressing the atomic diffusion can be improved by providing the interface layer on the side exposed to a great thermal load, i.e. on the side on which temperature increases more than the other side in recording and erasing (the side on which a laser beam is incident in many cases). Further, components contained in the interface layer may diffuse into the recording layer 4 after repeated recording of information. However, even in such a case, there may be no problem when a material that does not hinder the optical change of the recording layer 4 easily is used as a material of the interface layer.

A second important role of the interface layer is to exhibit an effect of facilitating crystallization of a recording material without deteriorating the thermal stability of recording marks (amorphous portions) when the interface layer is provided while being in contact with the recording layer 4. Since the interface layer performs such an important role, erasure with higher speed becomes possible. This effect becomes significant, particularly when the interface layer is provided on the side that is cooled more quickly than the other side of the recording layer after being irradiated by a laser beam or on the side on which a crystalline nucleus is formed more easily than on the other side, i.e. on an interface of the recording layer on the opposite side to a laser-beam incident side in many cases.

As described above, in view of the two roles of the interface layer, it is preferred to provide the interface layer on both sides of the recording layer 4 in order to provide both excellent rewriting characteristics at high speed and excellent repeatability. However, the interface layer may not be particularly necessary in some cases when the recording conditions of the medium require only low specifications, for example, when the recording conditions include low linear velocity and low density or when excellent repeatability is not particularly required.

As the material forming the interface layers 3 and 5, materials that can perform the above-mentioned roles may be acceptable. However, it is preferable that the material is one containing nitride, oxide nitride, oxide, carbide, or fluoride as the main component. In some cases, sulfide or selenide may be mixed. For example, Ge—N, Cr—N, Si—N, Al—N, Nb—N, Mo—N, Ti—N, Zr—N, Ta—N or the like can be used as nitride. As oxide nitride, Ge—O—N, Cr—O—N, Si—O—N, Al—O—N, Nb—O—N, Mo—O—N, Ti—O—N, Zr—O—N, Ta—O—N, or the like can be used. As oxide, $SiO_2$, $Al_2O_3$, $TiO_2$, $Ta_2O_5$, Zr—O, or the like can be used, and Ge—C, Cr—C, Si—C, Al—C, Ti—C, Zr—C, Ta—C, or the like can be used as carbide. Further, Li—F, Ca—F, or the like can be used as fluoride. Alternatively, a suitable mixture thereof may be used. When a suitable amount of sulfide or selenide is mixed, ZnS, ZnSe, or the like can be used. In any cases, the material used for the interface layers 3 and 5 may be one that does not disperse easily into the recording layer 4 or that does not easily hinder the optical change of the recording layer 4 even when dispersing into the recording layer 4 and that facilitates the crystallization of the recording layer 4 when being provided while being in contact with the recording layer 4.

It is preferable that the interface layers 3 and 5 have a thickness of at least 1 nm, since an effect for preventing the atomic dispersion is deteriorated when the interfaces layers 3 and 5 are thinner than 1 nm.

As a material of the recording layer 4, one whose optical characteristics vary reversibly is used. In the case of a phase change recording medium, it is preferable to use a chalcogenide-based material containing Te or Se as the main component. Examples of such a material include those containing Te—Sb—Ge, Te—Sb, Te—Sb—Zn, Te—Sb—Ag, Te—Bi—Ge, Te—Sb—Ge—Se, Te—Sn—Ge—Au, Te—Sb—Ag—In, Se—In—Sb, or Te—Se—In as the main component.

In some cases, the recording layer 4 may contain sputter gas components such as Ar, Kr, or the like and H, C, $H_2O$, or the like as impurities. However, no problem may be caused as long as the contents of such impurities are suppressed to the degree at which signal recording and reproduction are not hindered. For various purposes, a small amount (less than about 10 at %) of other materials may be added to the main component of the recording layer 4 in some cases. Similarly in this case, however, such other materials are acceptable when their contents are suppressed to the degree at which signal recording and reproduction are not hindered.

It is preferable that the recording layer 4 has a thickness between 3 nm and 20 nm. The reasons follow. The recording material is difficult to be formed in a uniform layer when the recording layer 4 is thinner than 3 nm, and therefore effective phase change between an amorphous state and a crystalline state becomes difficult to ensure. When the recording layer 4 has a thickness of at least 20 nm, the thermal diffusion in an inplane of the recording layer increases, thus causing adjacent erasure easily in recording information with high density.

As a material of the reflective layer 6, one containing at least one of Au, Ag, and Cu is used. The reason such a material is used is that its optical constant is advantageous in having a high value of Ac/Aa and that due to high thermal conductivity a high cooling power can be obtained even in the case of using a thin film. Alternatively, as a material of the reflective layer 6, a mixture of at least one of Au, Ag, and Cu and another material, or an alloy may be used. These other materials are used for enabling corrosion prevention or further effective optical design. Particularly, such materials include Cr, Pt, Pd, Al, Mg, W, Ni, Mo, Si, Ge, or the like. However, a material that is suitably selected according to intended use may be used.

It is preferable that the reflective layer 6 has a thickness between 1 nm and 20 nm. The reasons follow. The reflective layer 6 is difficult to be formed in a uniform layer when being thinner than 1 nm, and therefore thermal and optical effects of the reflective layer 6 are deteriorated. When the reflective layer 6 is thicker than 20 nm, optical transmission of a medium decreases. Thus, it is difficult to obtain the above-mentioned optical absorptive correction (Ac/Aa>1).

The thermal diffusion layer 7 that mainly characterizes the present invention is described as follows. The thermal diffusion layer 7 performs the following two important roles.

A first role of the thermal diffusion layer 7 is to cool the heat generated in the recording layer 4. When an optical transmission type thin layer is used as the reflective layer 6, a cooling effect in the reflective layer 6 decreases. In order to compensate this, without deteriorating optical characteristics as a medium, i.e. with transmittance of the medium being maintained, thermal diffusion should occur effectively in the thermal diffusion layer 7. Therefore, in the thermal diffusion layer 7, the absorptance of a laser beam in a wavelength range of a laser beam used for recording and reproduction must be low to some degree. When a complex index of refraction of the thermal diffusion layer 7 in a wavelength of a laser beam used for recording and reproduction is represented by n-ik, it is preferable that an absorption coefficient k satisfies the relationship of $k \leq 1.5$. In order to obtain greater cooling effect in the thermal diffusion layer 7, the material forming the thermal diffusion layer 7 is better to have the highest thermal conductivity possible. As a standard, it is preferred to use a material having a thermal conductivity of at least 0.05 W/m·K at 500K. The cooling effect of this thermal diffusion layer 7 enables a C/N ratio (a carrier to noise ratio) of a recording signal to be increased. In addition, since a thermal load on the medium can be decreased, repeated recording characteristics also can be improved.

A second role of the thermal diffusion layer 7 is further to increase the value of Ac/Aa when the medium has the same reflectance as that in the case where no thermal diffusion layer 7 is provided, by controlling its thickness d. This is possible when the thickness d of the thermal diffusion layer 7 is within the range of $0 < d \leq (5/16)\lambda/n$ or $(7/16)\lambda/n \leq d \leq (1/2)\lambda/n$, since high Ta and Tc (wherein Ta indicates transmittance of the medium with the recording layer 4 in an amorphous state, and Tc indicates transmittance of the medium with the recording layer 4 in a crystalline state) can be obtained when the thickness d of the thermal diffusion layer 7 is within the range described above. In the case where no absorption occurs in the layers other than the recording layer 4 and the reflective layer 6, theoretically the effect of increasing the value of Ac/Aa is exhibited when the thickness d satisfies $0 < d \leq (1/14)\lambda/n$. However, for instance, when the absorptance in an interface layer or the like is not zero, this optimum range may be shifted slightly depending on the layer structure of the medium. The above-mentioned range of the thickness d of the thermal diffusion layer 7 is estimated considering this shift approximately of $(1/16)\lambda/n$. In addition, when absorptance in the layers other than the recording layer 4 and the reflective layer 6 is not zero, for example, when the absorptance in the interface layers 3 and 5 and the thermal diffusion layer 7 is not zero, the effect of increasing the value of Ac/Aa may be obtained in a narrower range (for instance, $0 < d < \lambda/4$) than the range mentioned above in some cases. However, when much more weight is given to the above-mentioned cooling effect than to the effect of increasing the value of Ac/Aa, excellent disk characteristics may be obtained with a thicker thickness d even when the thickness d of the thermal diffusion layer 7 is slightly out of the optimum optical range. Therefore, considering the above comprehensively, it is conceivable that the above-mentioned range is suitable as the optimum range of the thickness d.

In order to obtain more effective increase in the value of Ac/Ac described above in the second role of the thermal diffusion layer 7, it is preferable that a refractive index n of the thermal diffusion layer 7 satisfies the relationship of $n > 1.60$, since the larger the refractive index n of the thermal diffusion layer 7 is, the more considerably the effect of increasing Ta and Tc can be obtained. In this case, the value 1.60 is an approximate refractive index of a layer (for instance, an overcoat layer, a UV resin layer, or a dummy substrate) that is provided on the opposite side to a laser-beam incident side and is in contact with the reflective layer 6 in a structure without using the thermal diffusion layer 7.

The conditions required for the thermal diffusion layer 7 that performs the above-mentioned two important roles are summarized as follows. It is desirable that the thickness d is in the range either of $0 < d \leq (5/16)\lambda/n$ or $(7/16)\lambda/n \leq d \leq (1/2)\lambda/n$. Further, when a complex index of refraction is represented by n-ik, it is preferred to satisfy the relationships of $n > 1.60$ and $k \leq 1.5$. The thermal conductivity is better to be as high as possible, and it is preferable that the thermal conductivity is at least 0.05 W/m·K at 500 K. In addition, of course, the thermal diffusion layer 7 should be formed of an excellent film in which cracking, corrosion, peeling off, or the like does not occur.

Concrete materials satisfying these conditions include, for example, Al—N, Al—O—N, Al—C, Si, Si—N, $SiO_2$, Si—O—N, Si—C, Ti—N, $TiO_2$, Ti—C, Ta—N, $Ta_2O_5$, Ta—O—N, Ta—C, Zn—O, ZnS, ZnSe, Zr—N, Zr—O—N, Zr—C, and W—C. Alternatively, mixtures thereof, mixtures of such materials and a suitable amount of metal or semimetal, or alloys may be used.

Since the optical information recording medium according to the present invention is formed to be an optical transmission type medium, a multilayer recording medium in which information can be recorded and reproduced by irradiation of a laser beam from one side can be formed. This provides an optical information recording medium in which recording can be performed with higher density to be obtained.

Figure 7:
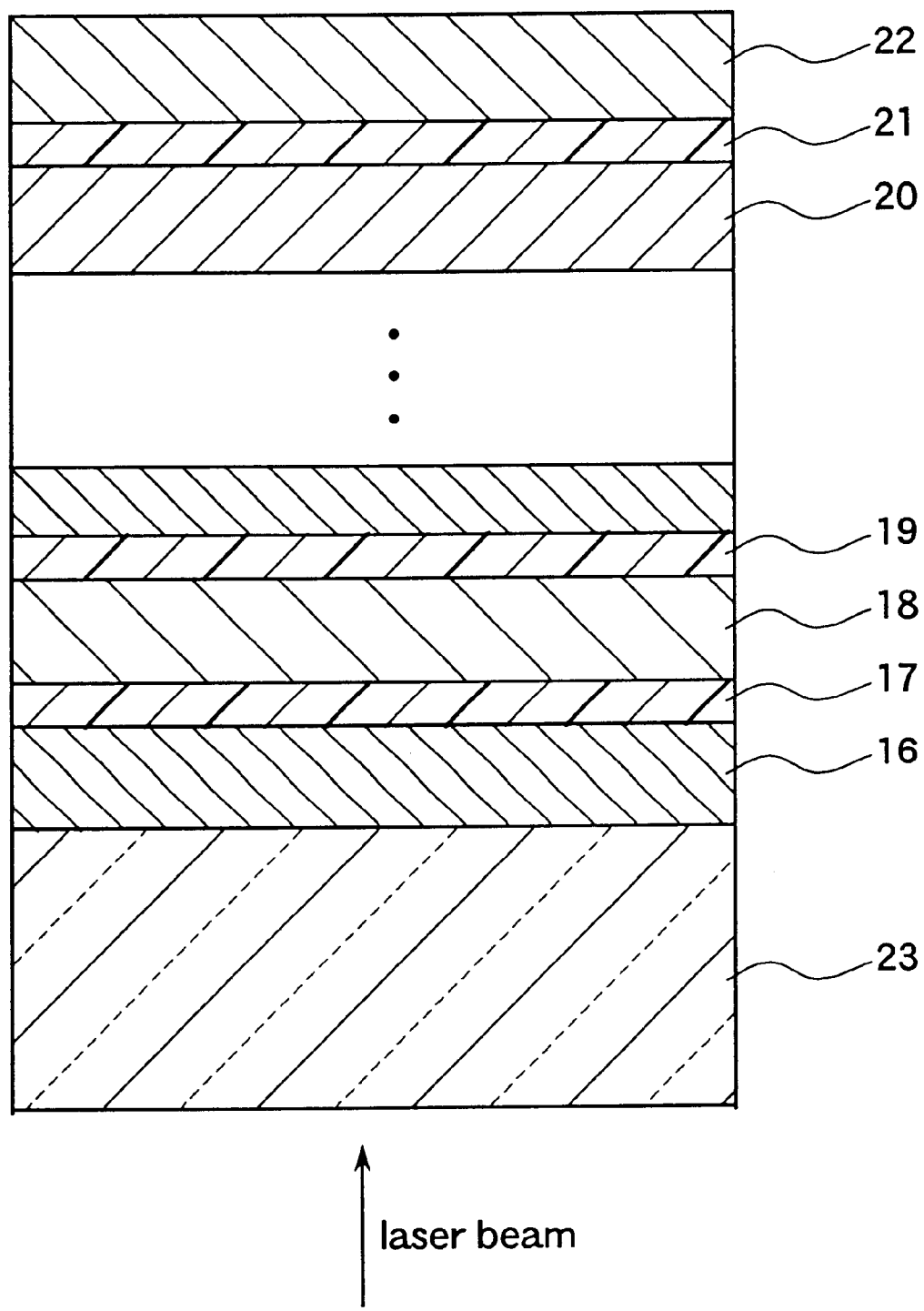
FIG. 7 is a cross-sectional view showing a layer structure of a multilayer recording medium according to an embodiment of the present invention.

FIG. 7 shows a structural example of a multilayer recording medium according to the present embodiment. As shown in FIG. 7, the multilayer recording medium of the present embodiment includes a substrate 23, n (a natural number satisfying n≧2) sets of media 16, 18, . . . , 20, 22 that are laminated sequentially on the substrate 23 via separating layers 17, 19, 21, and the like. In this case, media 16, 18, . . . , 20 to the medium located at the (n−1)th position counted from a laser-beam incident side (hereinafter, the medium located at the n-th position counted from the laser-beam incident side is referred to as "the n-th medium") are formed of optical transmission type media.

The separating layers 17, 19, 21, and the like are formed of resin such as ultraviolet curing resin or delayed action resin, dielectrics, or the like and are transparent layers with respect to a laser beam to be used. In this case, by the irradiation of the laser beam only from one side, the k-th medium (k is a natural number satisfying 1<k≦n) can be recorded and reproduced through the first to the (k−1)th media. Practically, it is desirable that the multilayer recording medium is formed of two sets of media (i.e. n=2).

Any of the first to the n-th media may be a medium exclusively used for reproduction (ROM (Read Only Memory)) or a write-once type medium.

As an example, a multilayer recording medium formed of two sets of media (i.e. n=2) is described in detail as follows.

Figure 8:
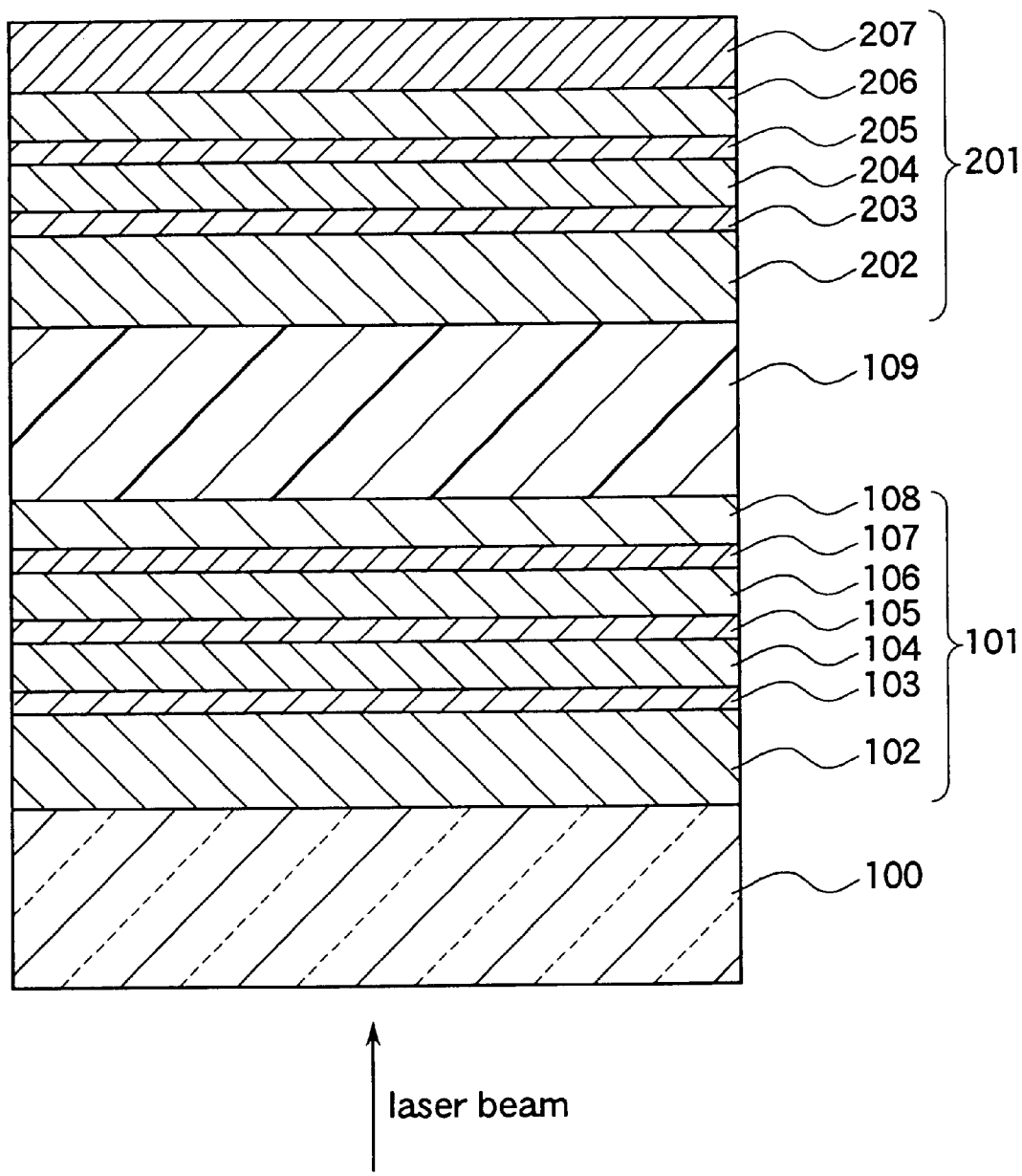
FIG. 8 is a cross-sectional view showing a layer structure of a multilayer recording medium formed of two sets of media according to an embodiment of the present invention.
Figure 9:
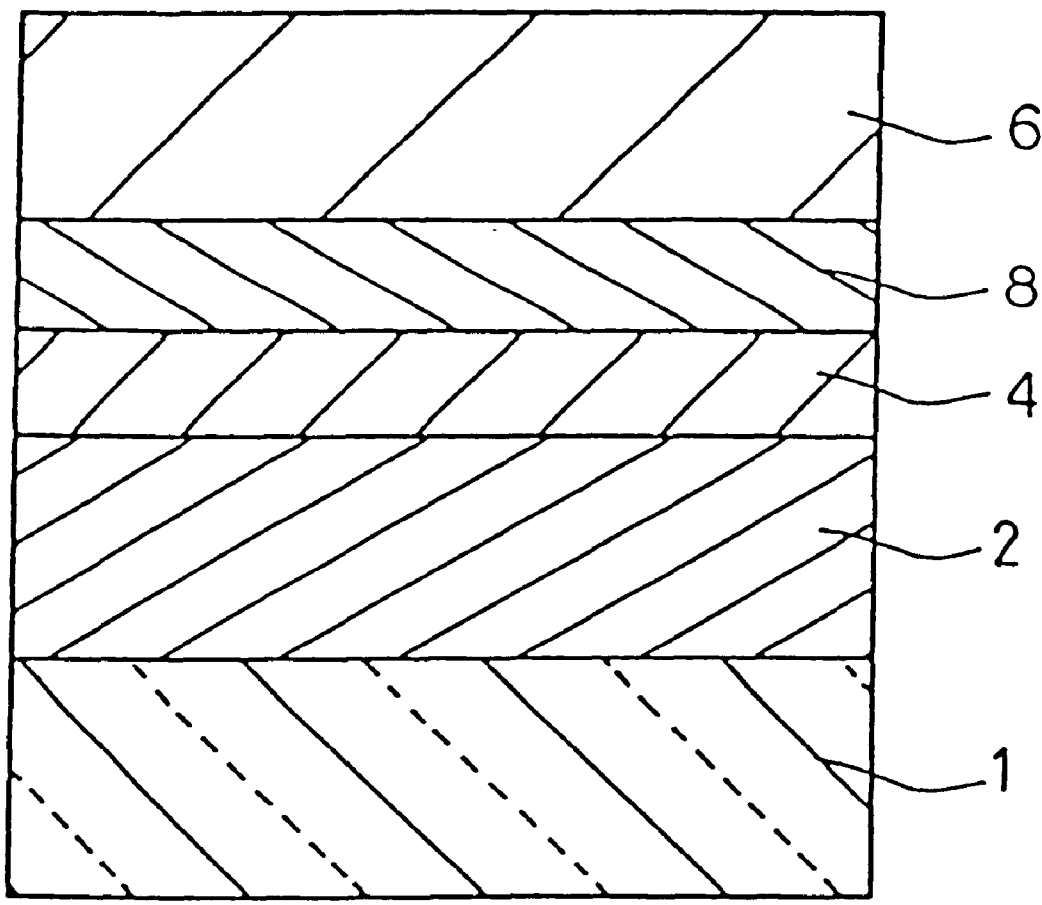
FIG. 9 is a cross-sectional view showing an example of a layer structure of a conventional phase change recording medium.

FIG. 8 shows a structural example of a multilayer recording medium formed of two sets of media. As shown in FIG. 8, this multilayer recording medium includes a substrate 100, and a first medium 101, a separating layer 109, and a second medium 201 that are laminated sequentially on the substrate 100. The first medium 101 includes a protective layer 102, an interface layer 103, a recording layer 104, an interface layer 105, a protective layer 106, a reflective layer 107, and a thermal diffusion layer 108 that are laminated sequentially from the substrate 100 side. The second medium 201 includes a protective layer 202, an interface layer 203, a recording layer 204, an interface layer 205, a protective layer 206, and a reflective layer 207 that are laminated sequentially from the separating layer 109 side. The same materials as described with respect to the medium shown in FIG. 1 can be used for the protective layers 102, 106, 202, and 206, the interface layers 103, 105, 203, and 205, the recording layers 104 and 204, the reflective layers 107 and 207, and the thermal diffusion layer 108.

The separating layer 109 is provided mainly for the purpose of optically separating the first medium 101 and the second medium 201. The separating layer 109 is formed of a material that enables optical absorptance with respect to a laser beam used for recording and reproduction to be as low as possible. As such a material, resin made of an organic material, such as ultraviolet curing resin and delayed action resin, a double sided adhesive sheet for an optical disk, an inorganic dielectric such as $SiO_2$, $Al_2O_3$, ZnS, or the like, or a glass material can be used.

The separating layer 109 is required to have a thickness at least equal to a focal depth $\Delta Z$ of a laser beam so that in recording and reproduction of one medium, crosstalk from the other medium can be suppressed to such a small degree as to be neglected. In this case, when 80% of the intensity of a focal point in the case where no aberration occurs is applied as a reference, the focal depth $\Delta Z$ can be expressed approximately by the following formula:

$$\Delta Z = \lambda / \{2 \times (NA)^2\},$$

wherein NA indicates a numerical aperture of an objective lens and $\lambda$ represents a wavelength of a laser beam used in recording and reproduction For instance, when $\lambda$=400 nm and NA=0.60, then the focal depth $\Delta Z$=0.56 μm. Therefore, in this case, it is necessary to set the thickness of the separating layer 109 to be thicker than at least 1.20 μm since the range of about ±0.60 μm falls within the focal depth.

Further, it is desirable that the thickness of the separating layer 109 is within an acceptable tolerance of the objective lens so that the distance between two media is in a range in which the objective lens can focus a laser beam.

Recording and reproduction in the second medium 201 are performed by transmitting a laser beam through the first medium 101. Therefore, a reflectance r2 of the second medium 201 in reproduction through the first medium 101 can be expressed by the following formula:

$$r2 = R2 \times T1 \times T1,$$

wherein T1 indicates a transmittance of the first medium 101 with respect to a wavelength of a laser beam used for recording and reproduction, R1 reflectance, and R2 reflectance of the second medium 201 alone.

Similarly, with respect to a signal amplitude, the relative equation:

$$\Delta r2 = \Delta R2 \times T1 \times T1$$

holds, wherein $\Delta R2$ indicates the reflectance difference in the second medium 201 alone, and $\Delta r2$ represents the reflectance difference in the second medium 201 in reproduction of the second medium 201 through the first medium 101.

For instance, when $\Delta R2$=24% and T1=50%, then the reflectance difference $\Delta r2$ in the second medium 201 in reproduction of the second medium 201 through the first medium 101 is 24%×0.5×0.5=6%.

As can be understood from the above, in order to obtain sufficient signals from the second medium 201, it is necessary to have the highest transmittance T1 of the first medium 101 and the greatest signal amplitude in the second medium 201 possible. At the same time, the reflectance difference in the first medium 101 is required to be large to some degree and recording sensitivity of the second medium 201 is required to be very high. The optical design of the first medium 101 and the second medium 201 must be determined so that all these factors are balanced.

A concrete example of optical designs is described as follows. As an example, a medium was designed so that the recording layer 104 of the first medium 101 had a reflectance R1c of 7.5% in a crystalline state and a reflectance R1a of 0.5% in an amorphous state, the recording layer 204 of the second medium 201 had a reflectance R2c of 15% in a crystalline state and a reflectance R2a of 43% in an amorphous state, and the first medium 101 had a transmittance of 50% when recording is performed only in the first medium. An optical design value was adjusted by varying the thickness mainly of the recording layer 104, the protective layers 102 and 106, and the reflective layer 107.

In the case of the above example, when recording and reproducing the second medium 201 through the first medium 101, the reflectance difference $\Delta r2$ is (43−15)×0.5×0.5=7% and the reflectance difference in the first medium 101 also is 7.5−0.5=7%. Thus, it is desirable that the reflectance differences, i.e. signal amplitudes in the first medium 101 and in the second medium 201 are almost equal to each other. Such a design can prevent tracking from being unstable due to extreme change in signal amplitudes when a medium to be recorded or reproduced is switched between the first medium 101 and the second medium 201.

Since it is very difficult to obtain the compatibility between the high transmittance of the first medium and the high reflectance difference in the second medium, the reflectance difference is relatively small after the completion of design and therefore the signal amplitude becomes relatively small in many cases. In this case, it is preferred to set a power level P3 of a reproduction light to be slightly higher than that in a conventional example to obtain large reproduction signal amplitude. However, when the level P3 is set to be too high, recording marks are affected thermally and thus reproduction signals deteriorate. Therefore, the level P3 has to be set in a range in which no signal deterioration is caused by the reproduction light. In addition, it would be no problem that the reproduction power levels in the first medium 101 and the second medium 201 are different from each other. Further, the wavelengths of respective laser beams with which the first medium 101 and the second medium 201 are reproduced may be different, but the laser beams with the same wavelength level are used in general.

When the second medium 201 is reproduced, it is desirable that the first medium 101 has a light transmittance between 40% and 80%, further desirably between 50% and 70%. As described above, the signal amplitude in recording and reproducing the second medium 201 through the first medium 101 is obtained by multiplying a square of the transmittance T1 of the first medium 101. Therefore, when the first medium 101 has a light transmittance of less than 40%, the signal amplitude is less than 0.16 times, which is quite small. On the other hand, when the light transmittance of the first medium 101 is very low, the quantity of light transmitted to reach the second medium 201 is decreased greatly, thus deteriorating the recording sensitivity of the second medium 201. Therefore, it is desirable that the light transmittance of the first medium 101 is set to be at least 40%, further desirably at least 50%. However, when the light transmittance of the first medium 101 is too high, it is difficult to obtain a large reflectance difference in the first medium. Therefore, it is desirable that the light transmittance of the first medium 101 is set to be 80% or less, further desirably 70% or less.

Figure 2:
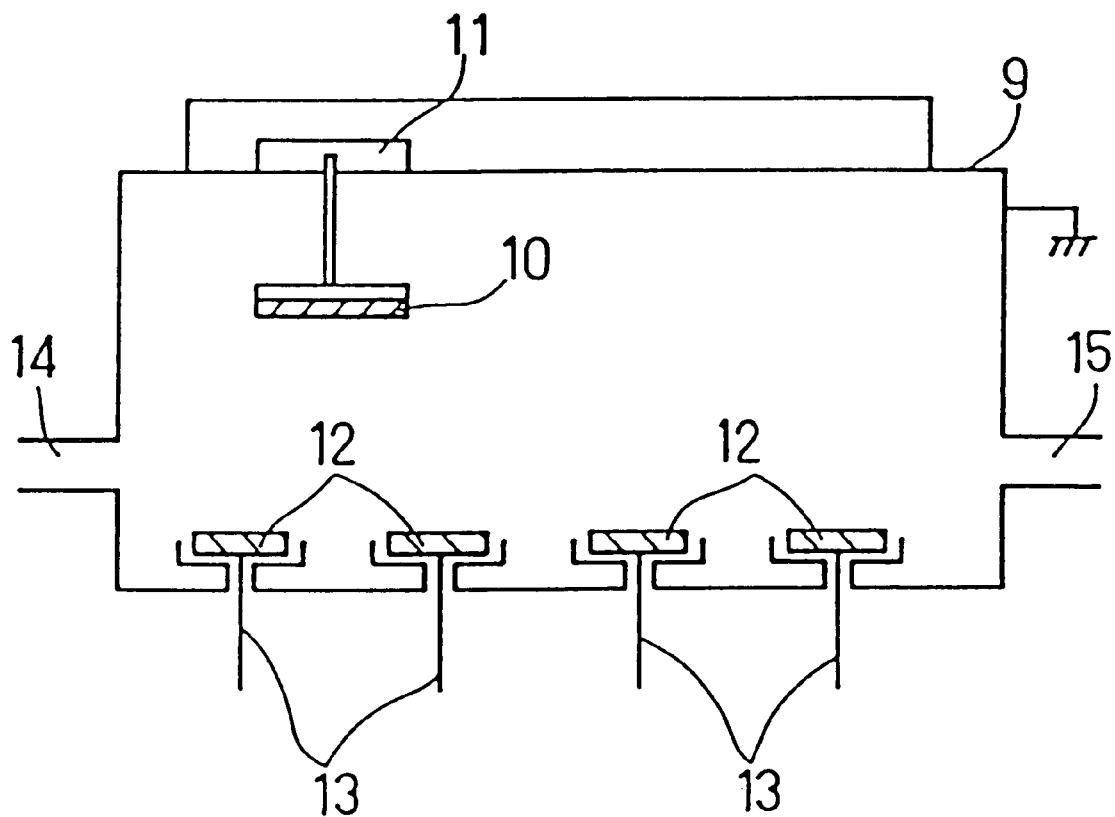
FIG. 2 is a schematic view showing an example of a film-forming device used for manufacturing an optical information recording medium according to an embodiment of the present invention.

A method of manufacturing the above-described optical information recording medium is described using an optical information recording medium with a structure shown in FIG. 1 as an example as follows. Methods of manufacturing multilayer films forming the above-mentioned optical information recording medium include a sputtering method, a vacuum evaporation, CVD, and the like. In this case, an example using the sputtering method is described as follows. FIG. 2 is a schematic view showing an example of a film-forming device.

As shown in FIG. 2, a vacuum pump (not shown in the figure) is connected to a vacuum container 9 via an air outlet 15, so that high vacuum can be maintained within the vacuum container 9. Further, the vacuum container 9 is provided with a gas supply port 14, so that rare gases, nitrogen, oxygen, or mixed gases thereof can be supplied from the gas supply port 14 at a constant flow rate. In FIG. 2, numeral 10 indicates a substrate positioned within the vacuum container 9, and this substrate 10 is attached to a drive 11 for revolving the substrate 10 on its own axis or rotating the substrate 10. Numeral 12 indicates a plurality of sputter targets positioned so as to oppose the substrate 10 within the vacuum container 9. These sputter targets 12 are connected to cathodes 13, respectively. In this case, the cathodes 13 are connected to a DC power supply or a high-frequency power supply (not shown in the figure) via a switch not shown in the figure. The vacuum container 9 and the substrate 10 are maintained at a positive charge by grounding the vacuum container 9.

As a film-forming gas, a rare gas or a mixed gas of a rare gas and a very small amount of nitrogen, oxygen, or the like is used selectively depending on the case. As the rare gas, one capable of forming a film, such as Ar, Kr, or the like, may be used. Generally, it has been known that when a mixed gas of a rare gas and a very small amount of nitrogen or oxygen is used for forming the recording layer 4 and the protective layer 2, mass transfer in repeated recording of a medium can be suppressed, thus improving the repeatability.

When nitride or oxide is used for the interface layers 3 and 5 or the thermal diffusion layer 7, films with an excellent quality can be obtained by sputtering using a reactive sputtering method. For example, when Ge—Cr—N is used for the interface layers 3 and 5, Ge—Cr or a material containing Ge, Cr, and O is used for targets and a mixed gas of a rare gas and nitrogen is used as a film-forming gas. Alternatively, a gas containing nitrogen atoms, such as $N_2O$, $NO_2$, NO, $N_2$, or the like, or a mixed gas of a suitable combination thereof and a rare gas may be used. In the case of a hard film, a high film stress, or the like, a layer with an excellent film quality may be obtained by mixing a very small amount of oxygen into a film-forming gas as required.

A recording/reproducing method and an erasing method in an optical information recording medium formed as described above are described as follows. In recording, reproduction, or erasure of signals, an optical head on which a laser beam source and an objective lens are mounted, a drive for leading a laser beam to a predetermined position to be irradiated, a tracking control unit and a focusing control unit for controlling positions in a track direction and a direction perpendicular to a film surface, a laser drive for modulating a laser power, and a rotation control unit for rotating the medium are used.

Signals are recorded or erased by rotating the medium using the rotation control unit and then focusing a laser beam into a minute spot using an optical system to irradiate the laser beam onto the medium. Recording marks or erased portions are formed by modulating the laser power between P1 and P2, wherein P1 indicates a power level for generating an amorphous state, which enables a local part of the recording layer 4 to be changed to an amorphous state reversibly by irradiation of the laser beam, and similarly, P2 represents a power level for generating a crystalline state, which enables a part of the recording layer 4 to be changed to a crystalline state reversibly by irradiation of the laser beam. Thus, recording, erasure, and overwriting of information are performed. Generally, the portion to be irradiated by a laser beam with the power P1 is formed by a pulse string, i.e. a so-called multiple pulse.

A reproduction power level P3 is set to be lower than both the power levels P1 and P2 described above, not to affect an optical state of a recording mark by irradiation of a laser beam at the power level, and to obtain sufficient reflectance for reproduction of recording marks from an medium by the irradiation of the laser beam. Signals obtained from the medium by the irradiation of the laser beam at the power level P3 are read by a detector, and thus information signals are reproduced.

EXAMPLE

A suitable example of the present invention is described as follows.

In the present example, an optical information recording medium with the structure shown in FIG. 1 was formed using disk-shaped polycarbonate resin with a thickness of 0.6 mm and a diameter of 120 mm as a substrate 1, a material prepared by mixing 20 mol % of $SiO_2$ into ZnS for a protective layer 2, $Ge_{21}Sb_{25}Te_{54}$ for a recording layer 4, Ge—Cr—O—N for interface layers 3 and 5, Au for a reflective layer 6, and Al—O—N for a thermal diffusion layer 7.

Figure 3:
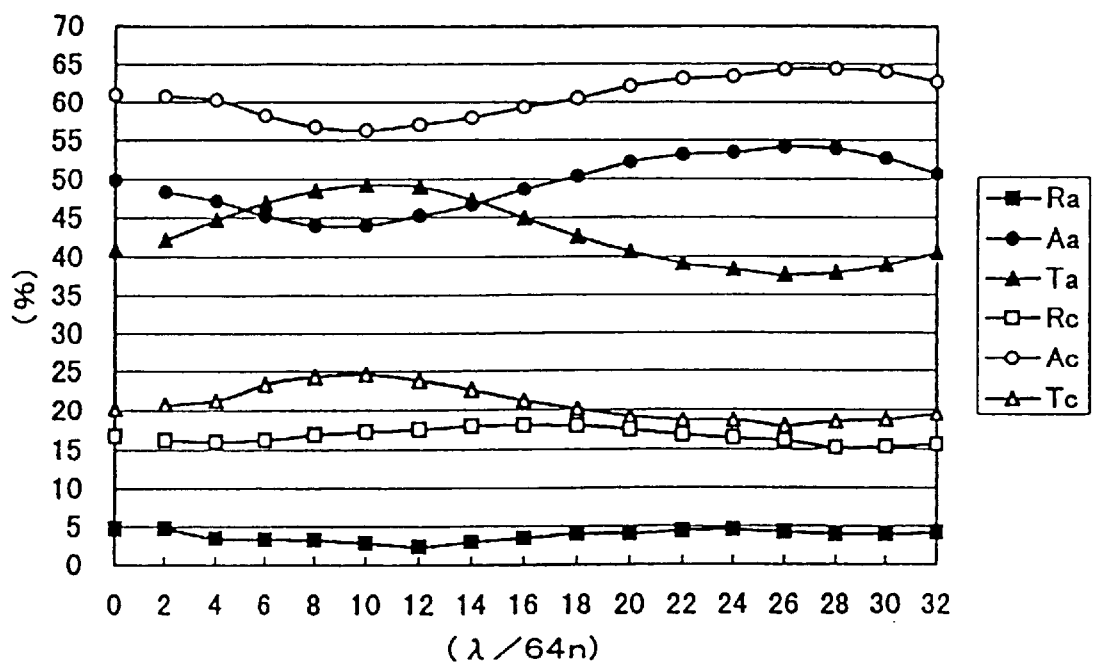
FIG. 3 shows the calculation results of the relationship between thickness and optical characteristics of a thermal diffusion layer in an optical information recording medium according to an embodiment of the present invention.
Figure 4:
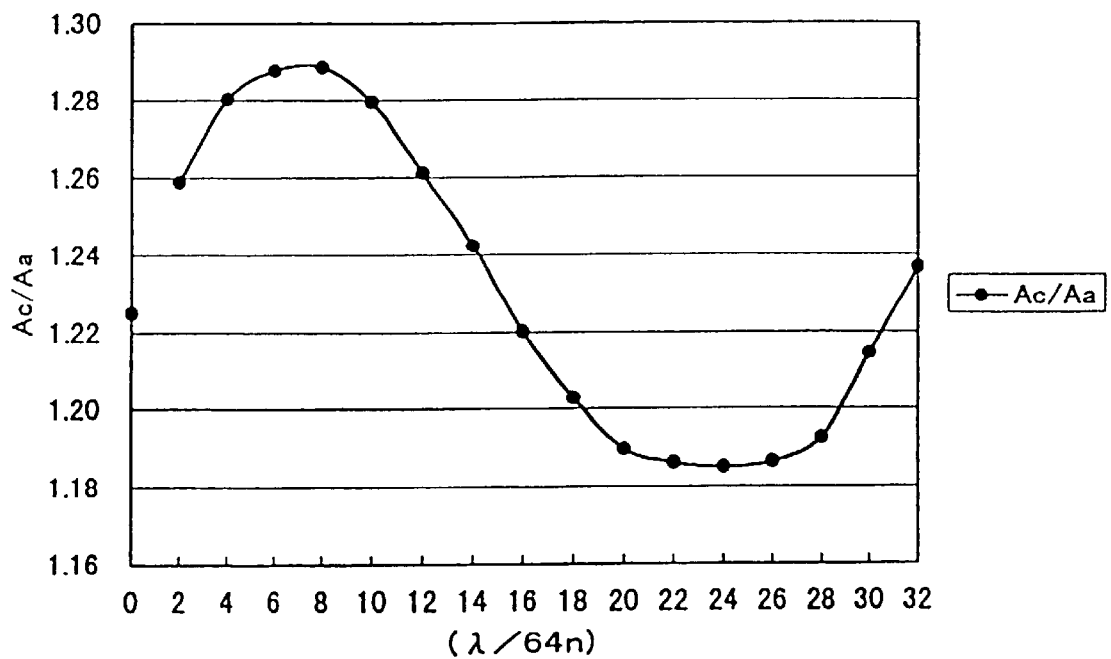
FIG. 4 shows the calculation result of the relationship between thickness and Ac/Aa of the thermal diffusion layer in the optical information recording medium according to an embodiment of the present invention.

FIG. 3 shows simulation results of optical characteristics in this case. The recording layer 4 had a thickness of 10 nm, the interface layers 3 and 5 had thicknesses of 10 nm and 30 nm respectively, and the reflective layer 6 had a thickness of 10 nm, which are respectively constant. By varying the thicknesses of the protective layer 2 and the thermal diffusion layer 7 from 0 to $\lambda/2n$ (wherein $\lambda$ indicates a laser beam wavelength and n represents a refractive index of each layer with respect to a wavelength $\lambda$), optical calculations with respect to absorptance Aa and Ac and reflectance Ra and Rc in the recording layer 4, absorptance Aa-RL and Ac-RL in the reflective layer 6 and transmittance Ta and Tc of the medium are performed when the recording layer 4 is in an amorphous state and in a crystalline state. In FIG. 3, the horizontal axis indicates the thickness (unit:×$\lambda$/64n) of the thermal diffusion layer 7 and shows the value obtained when the value of Ac/Aa is maximum in configurations satisfying Ra≦5% and Rc≧15%. In this case, the thickness of the protective layer 2 was approximately (26 to 30)$\lambda$/64n. As a comparative example, calculation results when no thermal diffusion layer 7 is provided are shown at the position of 0 on the horizontal axis in the figure. FIG. 4 shows the variation in value of Ac/Aa obtained by the above-mentioned optical calculations. As can be seen from FIGS. 3 and 4, when the thickness dof the thermal diffusion layer 7 (Al—O—N) satisfies 0<d≦$\lambda$/4n, the value of Ac/Aa is increased at approximately the same Rc and Ra compared to the case where no thermal diffusion layer 7 (Al—O—N) is provided.

Practically, three media with the structure shown in FIG. 1 were manufactured by using the above-mentioned materials. The thicknesses of respective layers were as follows. In the respective media, the protective layer 2 had a thickness of 100 nm, the recording layer 4 a thickness of 10 nm, the interface layers 3 and 5 thicknesses of 10 nm and 30 nm, and the reflective layer 6 a thickness of 10 nm. The thermal diffusion layers 7 in the three media had thicknesses of 40 nm (8$\lambda$/64n), 60 nm (12$\lambda$/64n), and 80 nm (16$\lambda$/64n), respectively, and these media are indicated with numerals (1), (2), and (3).

As a comparative example, a medium (0) having the same structure with that of the medium (1) except that no thermal diffusion layer 7 was provided was manufactured.

In this case, the recording layer 4 and the protective layer 2 were formed by supplying a gas prepared by mixing 2.5% of nitrogen into Ar at a constant flow rate so as to obtain respective total pressures of 1.0 m Torr and 0.5 m Torr and applying a DC power of 1.27 W/cm² and a RF power of 5.10 W/cm² to cathodes, respectively. The reflective layer 6 was formed by supplying an Ar gas so as to obtain a total pressure of 3.0 m Torr and applying a DC power of 4.45 W/cm². In forming the interface layers 3 and 5, Ge—Cr was used as a target material and a mixed gas of Ar and nitrogen as a sputter gas, and the sputter gas pressure was set to be 1 m Torr, the partial pressure of nitrogen to be 40% in the sputter gas, and the sputter power density to be 6.37 W/cm².

Characteristics of the disk were evaluated with respect to reflectance, a C/N ratio, and an overwriting erasing ratio.

As a signal mode in recording, a (8–16) modulation mode was employed and recording was performed by using a laser beam with a wavelength of 650 nm and an objective lens with a numeral aperture of 0.60. The shortest bit length was 0.28 µm (that is to say, the shortest mark length is 0.41 µm) and the rotational speed of the disk was set so as to obtain a linear velocity of 8.2 m/s. As a substrate 1, a substrate with a track pitch of 1.20 µm, i.e. a substrate in which groove portions and land portions were formed alternately every 0.60 µm, was used.

The C/N ratio was evaluated by recording a mark with a length of 3T (hereinafter referred to as a "3T mark") in the (8–16) modulation mode and measuring the C/N ratio. The erasing characteristics were evaluated by recording a 3T mark in the (8–16) modulation mode at an appropriate laser power, then overwriting it with a mark having a length of 11T (hereinafter referred to as a "11T mark"), and measuring the erasing ratio of the 3T mark (hereinafter referred to as a "3T erasing ratio") and the erasing ratio of the 11T mark (hereinafter referred to as a "11T erasing ratio") when a 11T mark was overwritten with a 3T mark. The following Table 1 shows the evaluation results of the media (0) to (3).

TABLE 1

| Medium Number | Reflectance (%) Rc | Reflectance (%) Ra | Transmittance (%) Tc | Transmittance (%) Ta | C/N Ratio (dB) | 3T Erasing Ratio (−dB) | 11T Erasing Ratio (−dB) |
|---|---|---|---|---|---|---|---|
| (0) | 16.1 | 4.7 | 20.0 | 40.0 | 52.0 | 30 | 33 |
| (1) | 16.2 | 4.5 | 24.5 | 48.0 | 54.5 | 33 | 36 |
| (2) | 16.8 | 4.4 | 23.8 | 48.0 | 55.0 | 33 | 35 |
| (3) | 17.1 | 4.2 | 21.0 | 45.0 | 55.0 | 32 | 34 |

As can be seen from Table 1 above, all the C/N ratios obtained in the media (1) to (3) having the thermal diffusion layers are increased compared to that in the medium (0) having no thermal diffusion layer. It is conceivable that a cooling effect of the thermal diffusion layer 7 (Al—O—N) is exhibited in each of the media (1) to (3). In the media (1) to (3), both the 3T erasing ratio and the 11T erasing ratio are increased. This denotes the improvement in Ac/Aa in the media. In Table 1 above, Ta indicates transmittance when the recording layer 4 is in an amorphous state and Tc represents transmittance when the recording layer 4 is in a crystalline state. The measurement of the transmittance of the media was performed by manufacturing disks with completely the same structures as those of the media (0) to (3) on mirror substrates and measuring transmittance of these disks using a spectroscope. As can be seen from Table 1, any transmittance obtained in the media (1) to (3) with thermal diffusion layers is higher than that in the medium (0) having no thermal diffusion layer.

Figure 5:
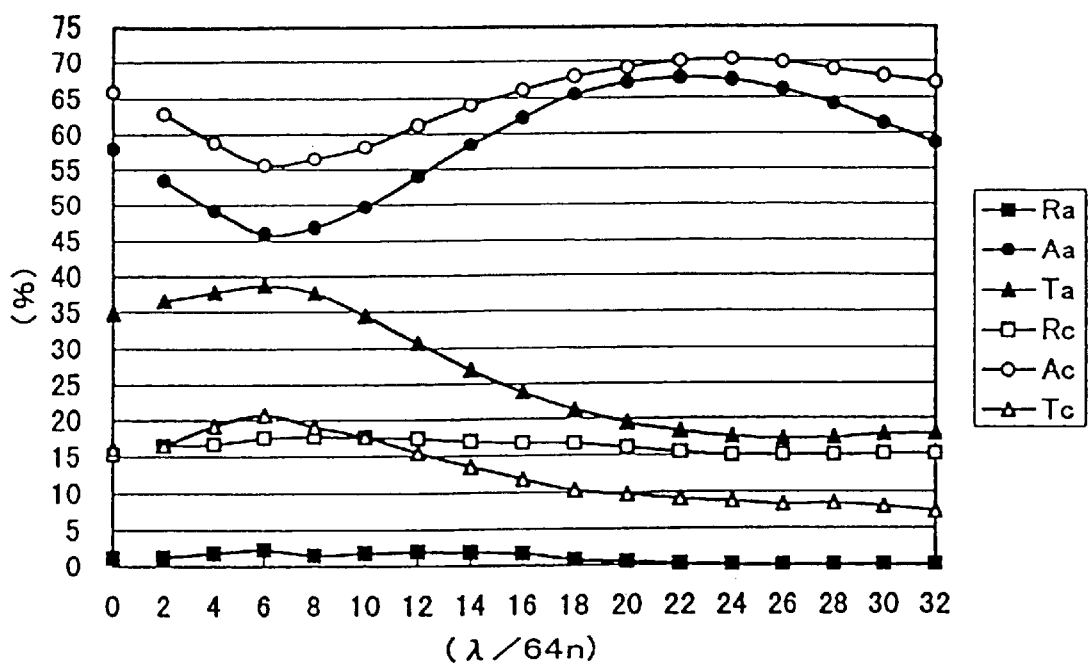
FIG. 5 shows the calculation result of the relationship between thickness and optical characteristics of a thermal diffusion layer in another optical information recording medium according to an embodiment of the present invention.
Figure 6:
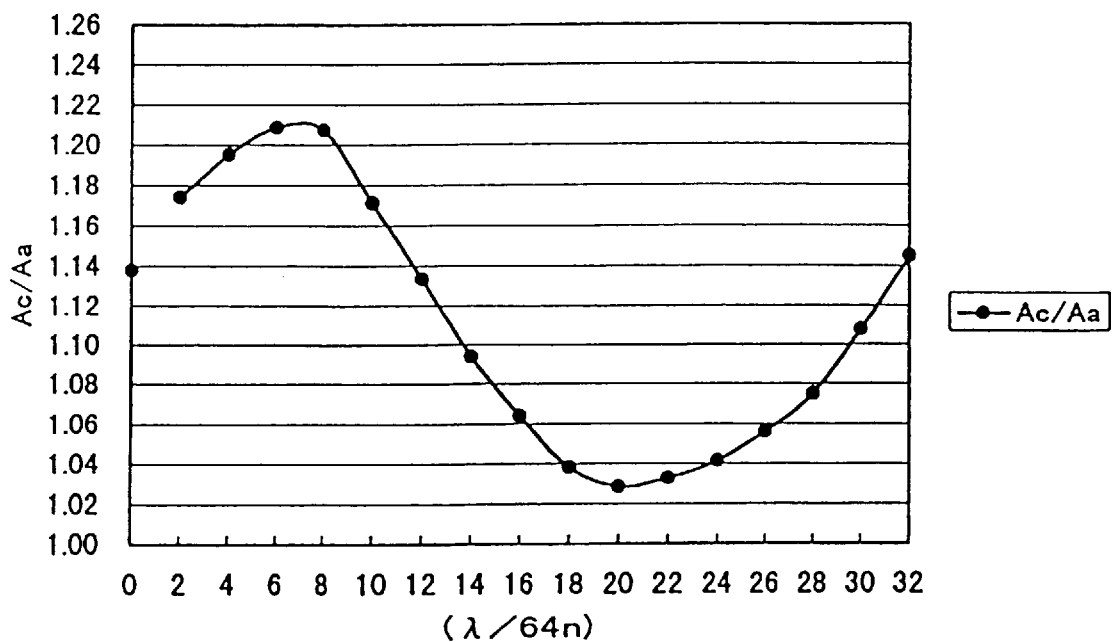
FIG. 6 shows the calculation result of the relationship between thickness and Ac/Aa of the thermal diffusion layer in the another optical information recording medium according to an embodiment of the present invention.

A medium with the same structure as that of the medium (1) except for interface layers 3 and 5 made of Cr—Al—O—N and thermal diffusion layers 7 made of Si is described as follows. FIGS. 5 and 6 show simulation results of the optical characteristics. In this case, a recording layer 4 had a thickness of 10 nm, interface layers 3 and 5 thicknesses of 20 nm and 35 nm respectively, and a reflective layer 6 a thickness of 15 nm. As can be seen from FIGS. 6 and 7, when the thickness dof the thermal diffusion layer 7 (Si) satisfies 0<d≦12$\lambda$/64 n, the value of Ac/Aa is increased at approximately the same Rc and Ra compared to the case where no thermal diffusion layer 7 (Si) is provided.

A medium (4) was manufactured with the same structure as that of the medium (1) except for a protective layer 2 with a thickness of 120 nm, interface layers 3 and 5 made of Cr—Al—O—N with thicknesses of 20 nm and 35 nm, a reflective layer 6 formed of Au with a thickness of 15 nm, and a thermal diffusion layer 7 made of Si with a thickness of 30 nm(8λ/64 n).

As a comparative example in this case, a medium (0)' was manufactured with the same structure as that of the medium (4) except that no thermal diffusion layer 7 was provided. Table 2 below shows the same evaluation results with respect to the media (4) and (0)' as those with respect to the media (0) to (3).

TABLE 2

| Medium Number | Reflectance % Rc | Reflectance % Ra | C/N Ratio (dB) | 3T Erasing Ratio (−dB) | 11T Erasing Ratio (−dB) |
|---|---|---|---|---|---|
| (0)" | 15.1 | 1.2 | 52.4 | 30 | 32 |
| (4) | 16.5 | 1.4 | 54.3 | 33 | 35 |

As can be seen from Table 2 above, similarly in this case, the C/N ratio and the erasing ratios when the thermal diffusion layer 7 was provided are increased compared to those when no thermal diffusion layer 7 was provided.

Second Embodiment

The present invention is described further in detail using another embodiment with reference to FIG. 8 used in the first embodiment as follows.

In the present embodiment, an optical information recording medium with the structure shown in FIG. 8 was manufactured using disk-shaped polycarbonate resin with a thickness of 0.6 mm and a diameter of 120 mm as a substrate 100, a material obtained by mixing 20 mol % of $SiO_2$ into ZnS for protective layers 102, 106, 202, and 206, Ge—Cr—N for interface layers 103, 105, 203, and 205, a AgPdCu alloy for reflective layers 107 and 207, $TiO_2$ for a thermal diffusion layer 108, and $Ge_4Sb_2Te_7$ for recording layers 104 and 204. The recording layers 104 and 204 have thicknesses of 6 nm and 9 nm, all the interface layers 103, 105, 203, and 205 a thickness of 2 nm, the reflective layers 107 and 207 thicknesses of 10 nm and 80 nm, the thermal diffusion layer 108 a thickness of 40 nm, the protective layers 102 and 106 thicknesses of 110 nm and 34 nm, and the protective layers 202 and 206 thicknesses of 90 nm and 40 nm, respectively.

The respective layers are formed under the same conditions as those in the above-described first embodiment.

Characteristics of the disk were evaluated by measuring a C/N ratio, an overwriting erasing ratio and cycling characteristics with respect to both a first medium 101 and a second medium 201.

As a signal mode in recording, a (8–16) modulation mode was employed and recording and reproduction were performed with respect to the first medium 101 and the second medium 201 by using a laser beam with a wavelength of 405 nm and an objective lens with a numeral aperture of 0.65. The shortest mark length was 0.26 μm and the rotational speed of the disk was set so as to obtain a linear velocity of 8.2 m/s. As the substrate 100, a substrate with a track pitch of 0.39 μm, i.e. a substrate in which groove portions and land portions were formed alternately every 0.195 μm, was used.

The C/N ratio was evaluated by recording a mark with a length of 3T (hereinafter referred to as a "3T mark") ten times at an appropriate laser beam power in the (8–16) modulation mode and measuring the C/N ratios. The overwriting erasing characteristics were evaluated by recording a 3T mark nine times at an appropriate laser power in the (8–16) modulation mode, then overwriting the 3T mark with a mark having a length of 11T (hereinafter referred to as a "11T mark") once at the same power, and measuring the erasing ratio of the 3T mark (hereinafter referred to as a "3T erasing ratio"). The cycling characteristics evaluation was performed by evaluating how much the jitter value was decreased when random signals were recorded as the number of recording times increased.

The power used for the reproduction of signals was set to be 1.0 mW with respect to both the first medium 101 and the second medium 201. The recording and reproduction of the second medium 201 were performed under the condition in which signals were not recorded in the first medium 101 for convenience.

The two-layer recording medium described above is referred to as a medium (5). For the purpose of comparison, a two-layer recording medium (6) was manufactured with the same structure as that of the medium (5) except that no thermal diffusion layer 108 was provided. Table 3 below shows evaluation results with respect to the media (5) and (6).

TABLE 3

| Medium Number | Thermal Diffusion Layer | C/N Ratio L1 | C/N Ratio L2 | Erasing Ratio L1 | Erasing Ratio L2 | Cycling Characteristics L1 | Cycling Characteristics L2 |
|---|---|---|---|---|---|---|---|
| (5) | $TiO_2$ | ○ | ○ | ○ | ○ | ○ | ○ |
| (6) | None | X | ○ | X | ○ | X | ○ |

In Table 3 above, L1 indicates the first medium 101 and L2 represents the second medium 201. With respect to the C/N ratio, the case where at least 50 dB was obtained is indicated by ○ and the case where less than 50 dB was obtained is indicated by x. Similarly, with respect to the erasing characteristics, the case where a 3T erasing ration of at least 33 dB was obtained is indicated by ○ and the case where a 3T erasing ration of less than 33 dB was obtained is indicated by x. As to the cycling characteristics, when random signals were recorded 10,000 times repeatedly at an appropriate laser power, the case where the deterioration amount in jitter value compared to that when signals were recorded ten times repeatedly was 2% or less is indicated by ○ and the case where that was larger than 2% by x.

As can be seen form Table 3, in the medium (5) having the thermal diffusion layer 108, high C/N ratios and erasing ratios were obtained with respect to both the first medium 101 (L1) and the second medium 201 (L2). On the contrary, with respect to the first medium 101 (L1) of the medium (6) having no thermal diffusion layer, both the C/N ratio and the erasing ratio were lower than those in the medium (5).

The reason can be described as follows. In the medium (6) having no thermal diffusion layer, it is difficult to have a high value of optical absorptive correction (a value of Ac/Aa) between a crystalline state and an amorphous state as described above. Therefore, the erasing ratio is low and the C/N ratio of a 3T signal after 10-times overwriting recording also is decreased in the medium (6).

In the medium (5) having the thermal diffusion layer 108, not only a high C/N ratio and a high erasing ratio but also high light transmittance can be obtained at the same time with respect to the first medium 101 (L1). Thus, excellent characteristics of the second medium 201 (L2) also can be obtained.

When comparing the medium (5) and the medium (6), it can be found that the thermal diffusion layer 108 has an effect for improving the cycling characteristics. It is conceivable that the cooling power that has been deteriorated by employing the thin reflective layer was compensated by the thermal diffusion layer 108 and the thermal load on the medium in repeated recording was decreased in the medium (5).

As another example, two-layer recording media (7) to (10) were manufactured using the same structure as that of the medium (5) except for the thermal diffusion layers 108 that are formed of Ti—N, $Ta_2O_5$, Si—N, and Zr—N, respectively. The same evaluations were performed with respect to the media (7) to (10) and the same excellent characteristics as those in the medium (5) were obtained. Similarly in the media (7) to (10), since the thermal diffusion layers 108 were provided, the compatibility between high transmittance and high absorptive correction was obtained and the cycling characteristics were improved greatly.

As described above, according to the present invention, an optical information recording medium is provided with a recording layer whose optical characteristics are varied reversibly by irradiation of a laser beam, a reflective layer that transmits the laser beam with a wavelength $\lambda$, and a thermal diffusion layer provided while being in contact with the reflective layer. In the medium, a thickness d of the thermal diffusion layer was set to be within a range of $0 < d \leq (5/16)\lambda/n$ or $(7/16)\lambda/n \leq d \leq (1/2)\lambda/n$, wherein n indicates a refractive index of the thermal diffusion layer. Therefore, the cooling power of the recording layer can be further improved and at the same time overwriting distortion can be decreased by the increase in value of Ac/Aa. Thus, recording can be performed at higher speed with higher density. In addition, due to the cooling effect of the thermal diffusion layer, the C/N ratio of a recording signal can be increased. Further, since the thermal load on the medium can be decreased, repeated recording characteristics also can be improved.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium, comprising:
    a recording layer whose optical characteristics are varied reversibly by irradiation of a laser beam;
    a reflective layer that transmits a laser beam with a wavelength $\lambda$; and
    a thermal diffusion layer that is provided while being in contact with the reflective layer,
    wherein a thickness d of the thermal diffusion layer is within a range of $0 < d \leq (5/16)\lambda/n$ or $(7/16)\lambda/n \leq d \leq (1/2)\lambda/n$, wherein n indicates a refractive index of the thermal diffusion layer.

2. The optical information recording medium according to claim 1,
    wherein thermal conductivity of a material forming the thermal diffusion layer is at least 0.05 W/m·K at 500 K.

3. The optical information recording medium according to claim 1,
    wherein a refractive index of the thermal diffusion layer is at least 1.6 with respect to a wavelength of a laser beam used for recording and reproduction of information.

4. The optical information recording medium according to claim 1,
    wherein an absorption coefficient of the thermal diffusion layer is 1.5 or less with respect to a wavelength of a laser beam used for recording and reproduction of information.

5. The optical information recording medium according to claim 1,
    wherein the thermal diffusion layer contains at least one selected from a group consisting of Al—N, Al—O—N, Al—C, Si, Si—N, $SiO_2$, Si—O—N, Si—C, Ti—N, $TiO_2$, Ti—C, Ta—N, $Ta_2O_5$, Ta—O—N, Ta—C, Zn—O, ZnS, ZnSe, Zr—N, Zr—O—N, Zr—C, and W—C.

6. The optical information recording medium according to claim 1,
    wherein the reflective layer contains at least one selected from a group consisting of Au, Ag, and Cu.

7. The optical information recording medium according to claim 1,
    wherein the reflective layer has a thickness between 1 nm and 20 nm.

8. The optical information recording medium according to claim 1,
    wherein the recording layer has a thickness between 3 nm and 20 nm.

9. The optical information recording medium according to claim 1,
    wherein the recording layer is formed of a phase change material containing at least one selected from a group consisting of Te, Se, and Sb.

10. The optical information recording medium according to claim 1,
    wherein the optical information recording medium has an average light transmittance between 40% and 80% with respect to the laser beam.

11. The optical information recording medium according to claim 10,
    wherein at least one other optical information recording medium is provided on an opposite side to an incident side of the laser beam.

12. The optical information recording medium according to claim 1,
    wherein the optical information recording medium further comprises an interface layer that has an effect for facilitating crystallization of the recording layer and that is in contact with at least one side of the recording layer.

13. The optical information recording medium according to claim 12,
    wherein the interface layer is formed of a material containing at least N.

* * * * *